(12) United States Patent
Kim et al.

(10) Patent No.: US 12,358,478 B2
(45) Date of Patent: Jul. 15, 2025

(54) BRAKE TRACTION CONTROL SYSTEM USING REDUNDANCY BRAKING SYSTEM

(71) Applicants: Hyundai Motor Company, Seoul (KR); Kia Corporation, Seoul (KR)

(72) Inventors: Joo Beom Kim, Gwacheon-Si (KR); Yoon Seong Jeon, Gwangmyeong-Si (KR); Ho Jung Nam, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 228 days.

(21) Appl. No.: 18/094,782

(22) Filed: Jan. 9, 2023

(65) Prior Publication Data

US 2024/0101089 A1 Mar. 28, 2024

(30) Foreign Application Priority Data

Sep. 26, 2022 (KR) .......................... 10-2022-0122001

(51) Int. Cl.
*B60T 8/00* (2006.01)
*B60T 8/58* (2006.01)
(Continued)

(52) U.S. Cl.
CPC ............ *B60T 8/96* (2013.01); *B60T 8/58* (2013.01); *B60T 13/58* (2013.01); *B60T 2210/20* (2013.01); *B60T 2220/06* (2013.01); *B60T 2240/00* (2013.01); *B60T 2270/402* (2013.01); *B60T 2270/413* (2013.01)

(58) Field of Classification Search
CPC ... B60T 8/96; B60T 8/58; B60T 13/58; B60T 2210/20; B60T 2220/06; B60T 2240/00; B60T 2270/402; B60T 2270/413; B60T 7/12; B60T 17/221; B60T 13/662; B60T 13/741; B60T 2210/32; B60T 2250/04;
(Continued)

(56) References Cited

U.S. PATENT DOCUMENTS

2006/0208566 A1* 9/2006 Ohtsu .................... B60T 8/245
303/191
2016/0221446 A1* 8/2016 Suzuki .................... B60L 58/20
(Continued)

FOREIGN PATENT DOCUMENTS

CN 113752999 A 12/2021
JP 2019-189109 A 10/2019
(Continued)

*Primary Examiner* — Shardul D Patel
(74) *Attorney, Agent, or Firm* — MORGAN, LEWIS & BOCKIUS LLP (57) ABSTRACT

A brake traction control system (BTCS) using a redundancy braking system includes a main braking force adjusting device configured to control a hydraulic brake of a vehicle, a sensor unit configured to detect a driving state of the vehicle, an electronic brake electrically operating and configured to generate braking force for at least one driving wheel, and an auxiliary braking force adjusting device configured to control the hydraulic brake and the electronic brake when a failure occurs in the main braking force adjusting device, wherein the auxiliary braking force adjusting device is configured to adjust the braking force of the electronic brake provided on at least one wheel on left and right sides of the vehicle based on a detected value of the sensor unit.

20 Claims, 6 Drawing Sheets (51) Int. Cl.
*B60T 8/96*    (2006.01)
*B60T 13/58*    (2006.01)

(58) Field of Classification Search
CPC ... B60T 8/00; B60Y 2306/13; B60Y 2306/15; B60Y 2400/81
USPC .......................................................... 701/70
See application file for complete search history.

(56)          References Cited

U.S. PATENT DOCUMENTS

2019/0331221 A1\*  10/2019  Shirakawa .............. B60T 11/10
2021/0009095 A1    1/2021  Kim
2021/0370899 A1    12/2021  Hwang
2021/0380088 A1    12/2021  Yoo
2022/0055592 A1\*   2/2022  Leiber .................... B60T 13/00

FOREIGN PATENT DOCUMENTS

KR    10-2021-0148633 A    12/2021
WO    WO 2021/246930 A1    12/2021

\* cited by examiner

BRAKE TRACTION CONTROL SYSTEM USING REDUNDANCY BRAKING SYSTEM

CROSS-REFERENCE TO RELATED APPLICATIONS

The present application claims priority to Korean Patent Application No. 10-2022-0122001 filed on Sep. 26, 2022, the entire contents of which is incorporated herein for all purposes by this reference.

BACKGROUND OF THE PRESENT DISCLOSURE

Field of the Present Disclosure

The present disclosure relates to a brake traction control system (BTCS) using a redundancy braking system.

Description of Related Art

A traction control system (TCS) may support safe driving by reducing rolling of a vehicle body by controlling driving force of a wheel causing excessive slip. The traction control system may prevent driving wheels from spinning when a vehicle starts, accelerates, or climbs, maintaining driving stability of the vehicle. For example, the system may, in the case that left and right driving wheels of a vehicle stop on a road surface with different friction coefficients and start, limit rotation force on the driving wheel on the side on which more wheel slip occurs and helps the vehicle start using driving force of the driving wheels with less wheel slip, that is, the driving wheel on the side including a relatively high coefficient of friction.

The traction control system may include an engine traction control system (ETCS) controlling driving force of driving wheels using an engine, a brake traction control system (BTCS) controlling by reducing driving force by applying braking force to the driving wheel, and a full traction control system (FTCS) which simultaneously applies an engine traction control system and a brake traction control system, which may apply braking force to a wheel causing slippage and reducing the engine output at the same time.

A brake traction control system may be designed to be controlled through a hydraulic brake which may perform linear control through a fast reaction speed and hydraulic pressure. Accordingly, when a main hydraulic brake of vehicle malfunctions and a hydraulic brake provided on the driving wheels may not be controlled, it is impossible to use the brake traction control system. Also, even when the main braking force adjusting device malfunctions and driving by controlling an electronic brake (for example, an electronic parking brake (EPB)) provided on the driving wheel through an auxiliary braking force adjusting device, a brake traction control system may not be used due to reaction delay and because it may be difficult to perform linear braking force control of an electronic brake.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a brake traction control system which may be applicable even when an auxiliary braking force adjusting device controls braking using an electronic brake of driving wheels using a redundancy braking system.

According to an aspect of the present disclosure, a brake traction control system (BTCS) using a redundancy braking system includes a main braking force adjusting device configured to control a hydraulic brake of a vehicle, a sensor unit configured to detect a driving state of the vehicle, an electronic brake electrically operating and configured to generate braking force for at least one driving wheel, and an auxiliary braking force adjusting device configured to control the hydraulic brake and the electronic brake when a failure occurs in the main braking force adjusting device, wherein the auxiliary braking force adjusting device is configured to adjust the braking force of the electronic brake provided on at least one wheel on left and right sides of the vehicle based on a detected value of the sensor unit.

The sensor unit may include a wheel speed sensor configured to detect a rotation speed of a wheel, and a gradient sensor configured to detect a slope of a road on which the vehicle is travelling.

The wheel speed sensor may include a first wheel speed sensor provided on one of a left wheel and a right wheel and a second wheel speed sensor provided on the other of the left wheel or the right wheel.

The electronic brake may include a first electronic brake provided on one of a left wheel and a right wheel of driving wheels and a second electronic brake provided on the other of the left wheel and the right wheel of the driving wheels.

The auxiliary braking force adjusting device may be configured to selectively adjust braking force of the first electronic brake and the second electronic brake based on a wheel speed detected by the sensor unit.

The auxiliary braking force adjusting device may control the electronic brake provided on a wheel including a greater wheel speed among the at least one wheel detected by the sensor unit.

The auxiliary braking force adjusting device may adjust a magnitude of braking force of the electronic brake based on a gradient ratio detected by the sensor unit.

The auxiliary braking force adjusting device may control a magnitude of braking force of the electronic brake by adjusting a driving time of the electronic brake.

The auxiliary braking force adjusting device may apply a longer driving time of the electronic brake as a gradient ratio of a road on which the vehicle is traveling increases.

According to another aspect of the present disclosure, a brake traction control system (BTCS) using a redundancy braking system includes an operation of performing a redundancy braking control system mode in which a vehicle travels while controlling braking force of at least one driving wheel with an electronic brake, an operation of identifying whether a condition for entering the redundancy brake traction control system mode is satisfied, and an operation of travelling the vehicle in the redundant brake traction control system mode, wherein the operation of travelling the vehicle in the redundant brake traction control system mode includes adjusting braking force of the electronic brake provided on at least one of left and right sides of the driving wheels based on a detected value of a sensor unit.

The brake traction control system may further include an operation of preparing a redundant brake traction control system (RDD BTCS) mode, wherein, when an accelerator pedal operates, the electronic brake is disengaged.

The condition for entering the redundancy brake traction control system mode may be a condition in which an estimated vehicle speed determined based on a wheel speed of a left wheel and a right wheel of the driving wheels is determined, and a difference between the determined estimated vehicle speeds is equal to or greater than a predetermined value.

The condition for entering the redundancy brake traction control system mode may be a condition in which a gradient ratio of a road on which the vehicle is traveling is equal to or greater than a predetermined value.

The operation of travelling the vehicle in the redundant brake traction control system mode may include identifying a gradient ratio of a road on which the vehicle is traveling and a wheel speed, and performing braking control of the electronic brake based on the gradient ratio and the wheel speed.

The performing braking control of the electronic brake may include controlling an electronic brake provided on a wheel including a greater wheel speed among the at least one wheel, and adjusting a magnitude of braking force of the electronic brake based on the gradient ratio.

A magnitude of the braking force of the electronic brake may be controlled by determining a level of a driving state of a vehicle based on a table provided according to the gradient ratio, and adjusting a driving time of the electronic brake according to the determined level.

The performing braking control of the electronic brake may include identifying a change in wheel slip, and adjusting braking force of the electronic brake according to a change in wheel slip.

The adjusting braking force of the electronic brake according to a change in wheel slip may include increasing braking force of the electronic brake when the wheel slip increases, and decreasing the braking force of the electronic brake when the wheel slip decreases.

The brake traction control system may further include an operation of identifying whether a condition for releasing the redundancy brake traction control system mode is satisfied, wherein the redundancy brake traction control system mode is released when a speed difference between wheels on both sides of the driving wheels is equal to or less than a predetermined value, and when the redundancy brake traction control system mode is released, the electronic brake is also disengaged.

The operation of travelling the vehicle in the redundant brake traction control system mode includes blocking a function of automatically disengaging the electronic brake when an accelerator pedal of the vehicle is operated.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described with reference to the appended drawings.

Elements including the same function in the scope of the same concept represented in the drawings of various exemplary embodiments will be described using the same reference numeral.

The terms "first," "second," and the like may be used to distinguish one element from the other, and may not limit a sequence and/or an importance, or others, in relation to the elements. In some cases, a first element may be referred to as a second element, and similarly, a second element may be referred to as a first element without departing from the scope of right of the embodiments.

The terms, "include," "comprise," "is configured to," etc. of the description are used to indicate the presence of features, numbers, steps, operations, elements, parts or combination thereof, and do not exclude the possibilities of combination or addition of one or more features, numbers, steps, operations, elements, parts or combination thereof.

Unless otherwise defined, all terms used herein, including technical or scientific terms, have the same meanings as those which would be generally understood by those with ordinary knowledge in the field of art to which the present disclosure belongs. Terms such as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
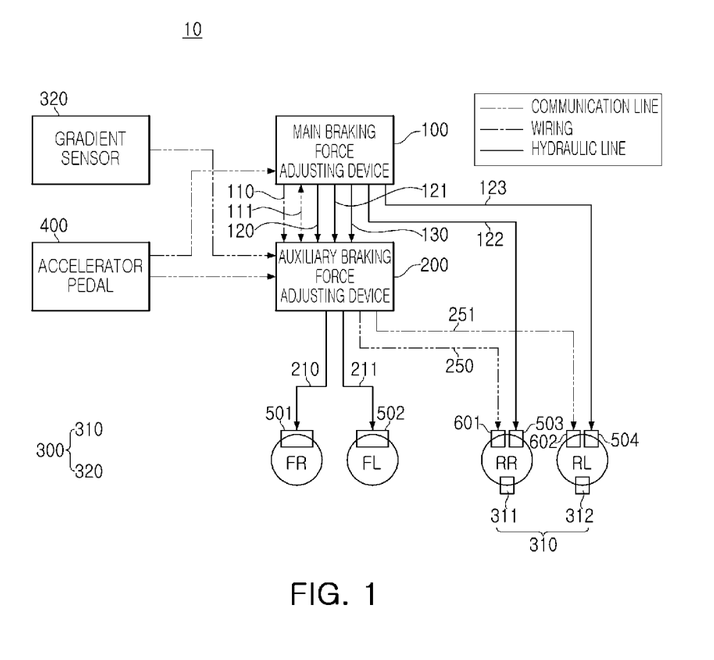
FIG. 1 is a block diagram illustrating a redundancy braking system according to an exemplary embodiment of the present disclosure.

FIG. 1 is a block diagram illustrating a redundancy braking system according to an exemplary embodiment of the present disclosure.

Referring to FIG. 1, the redundancy braking system 10 may include a main braking force adjusting device 100, an auxiliary braking force adjusting device 200, a sensor unit 300, and an accelerator pedal 400.

The main braking force adjusting device 100 may receive a signal regarding stroke of the brake pedal reflecting a user's intention to brake, and may perform braking by controlling braking hydraulic pressure of the front and rear wheels of the vehicle. Here, the main braking force adjusting device may adjust braking hydraulic pressure based on information such as an adjustment amount and an adjustment speed of the brake pedal through a sensor attached to the brake pedal. The main braking force adjusting device 100 may be an integrated electrical booster, but an exemplary embodiment thereof is not limited thereto.

Also, the main braking force adjusting device 100 may include first to fourth main hydraulic lines 120, 121, 122, and 123 connected to the front and rear wheels of the vehicle. The main hydraulic lines 120, 121, 122, and 123 may be connected to hydraulic brakes 501, 502, 503, and 504 provided on the left and right sides of the front wheel and the left and right sides of the rear wheel of the vehicle, respectively. Here, the hydraulic brakes 501, 502, 503, and 504 may generate braking force by controlling a brake disc or a brake drum through hydraulic pressure.

The main braking force adjusting device 100 may be connected to the hydraulic brakes 501, 502, 503, and 504 via the auxiliary braking force adjusting device 200. Referring to FIG. 1, the main braking force adjusting device 100 may be connected to the auxiliary braking force adjusting device 200 through the first main hydraulic line 120 and the second main hydraulic line 121, and the auxiliary braking force adjusting device 200 may be connected to the hydraulic brakes 501 and 502 on the left and right sides of the front wheels through the first redundancy hydraulic lines 210 and 211. The first main hydraulic pressure line 120 of the main braking force adjusting device 100 may be connected to the hydraulic brake 501 on the right side of the front wheel through the first redundancy hydraulic line 210 of the auxiliary braking force adjusting device 200. The second main hydraulic line 121 of the main braking force adjusting device 100 may be connected to the hydraulic brake 502 on the left side of the front wheel through the first redundancy hydraulic line 211 of the auxiliary braking force adjusting device 200. Also, the main braking force adjusting device 100 may be connected to the hydraulic brake 503 on the right side of the rear wheel through the third main hydraulic line 122, and may be connected to the hydraulic brake 504 on the left side of the rear wheel through the fourth main hydraulic line 123.

Here, the main braking force adjusting device 100 may be connected via the hydraulic brakes 501 and 502 of the front wheels and the auxiliary braking force adjusting device 200, but an exemplary embodiment thereof is not limited thereto, and the main braking force adjusting device 100 may be connected to the hydraulic brakes 503 and 504 of the rear wheels via the auxiliary braking force adjusting device 200. The main braking force adjusting device 100 and the auxiliary braking force adjusting device 200 are not limited to a specific connection structure. In the instant case, the hydraulic brakes 501 and 502 of the front wheels may be directly connected to the main braking force adjusting device 100. Here, hydraulic brakes connected via the main braking force adjusting device 100 and the auxiliary braking force adjusting device 200 may be referred to as first hydraulic brakes 501 and 502, and hydraulic brakes directly connected to the main braking force adjusting device 100 may be referred to as second hydraulic brakes 503 and 504.

The auxiliary braking force adjusting device 200 may determine whether the main braking force adjusting device 100 is faulty, and when a failure occurs in the main braking force adjusting device 100, the auxiliary braking force adjusting device 200 may replace the main braking force adjusting device 100 and may control braking force of the vehicle. The auxiliary braking force adjusting device 200 may be connected to the first hydraulic brakes 501 and 502 through the first redundancy hydraulic lines 210 and 211, and may generate braking force by controlling the braking hydraulic pressure of the first hydraulic brakes 501 and 502.

Also, the auxiliary braking force adjusting device 200 may control the wheel provided with the second hydraulic brake 503 and 504, not connected via the hydraulic line, using electronic brake 601 and 602 which may be electrically connected. Here, the electrically connected electronic brake may be electronic parking brakes (EPB) 601 and 602. The auxiliary braking force adjusting device 200 may be connected to the right side of the rear wheel and the first electronic brake control line 250, and may be connected to the left side of the rear wheel and the second electronic brake control line 251. The auxiliary braking force adjusting device 200 may generate braking force by controlling the first electronic brake 601 and the second electronic brake 602 provided on the rear wheels through the first electronic brake control line 250 and the second electronic brake control line 251. The electronic brakes 601 and 602 may include an electric motor, and may generate braking force by operating the electric motor in response to an electric signal.

The auxiliary braking force adjusting device 200 may receive a stroke signal of the brake pedal reflecting a user's intention to brake and may control the first hydraulic brakes 501 and 502 to generate braking force. The auxiliary braking force adjusting device 200 may adjust braking hydraulic pressure based on information such as an adjustment amount and an adjustment speed of the brake pedal through a sensor attached to the brake pedal. Here, the brake pedal may be connected to each of the main braking force adjusting device 100 and the auxiliary braking force adjusting device 200. Information such as the adjustment amount and control speed of the brake pedal may be transmitted to the main braking force adjusting device 100 when the main braking force adjusting device 100 is operating normally, and when the main braking force adjusting device 100 fails, the information may be transmitted to the auxiliary braking force adjusting device 200. Accordingly, even when a failure occurs in the main braking force adjusting device 100, the auxiliary braking force adjusting device 200 may control braking force by receiving the user's intention to brake based on information such as the adjustment amount and the adjustment speed of the brake pedal.

Also, the auxiliary braking force adjusting device 200 may be connected to the main braking force adjusting device 100 and the braking oil supply line 130. The auxiliary braking force adjusting device 200 may receive braking oil for generating hydraulic pressure through a braking oil supply line 130, and may control hydraulic pressure through the line. The brake oil supply line 130 may be a branched line from a brake oil reservoir tank included in the main brake force adjusting device 100, and may be a line for supplying brake oil to the auxiliary brake force adjusting device 200. However, an exemplary embodiment thereof is not limited thereto, and a brake oil reservoir tank for supplying brake oil to the auxiliary brake force adjusting device 200 may be provided.

The sensor unit 300 may include a wheel speed sensor 310 and a gradient sensor 320 provided on the front and rear wheels and may detect a rotation speed of each wheel. Here, the wheel speed sensor 310 provided on the right wheel provided with the electronic brakes 601 and 602 electrically connected to the auxiliary braking force adjusting device 200 may be referred to as a first wheel speed sensor 311, and the wheel speed sensor provided in the left wheel may be referred to as a second wheel speed sensor 312. Also, the sensor unit 300 may include a gradient sensor 320 for detecting a gradient ratio of a road on which the vehicle is traveling.

The accelerator pedal 400 may be a device transmitting a user's intention to start or accelerate, and when the user wants to start or accelerate, the accelerator pedal 400 may be pressed with a foot. The vehicle may start or accelerate the vehicle by operating an engine or a motor according to the control amount and control speed of the accelerator pedal 400 of the user.

The components of the brake traction control system (BTCS) 10 using the redundancy braking system may be connected to each other in a wired or wirelessly and may exchange information. For example, the data may be exchanged using communication means such as Ethernet, media oriented systems transport (MOST), Flexray, controller area network (CAN), local interconnect network (LIN), Internet, LTE, 5G, Wi-Fi, Bluetooth, near field communication (NFC), Zigbee, radio frequency (RF).

Here, the main braking force adjusting device 100 and the auxiliary braking force adjusting device 200 may be connected to each other through an additional wire in addition to the common communication means provided in the above-described vehicle. For example, the main braking force adjusting device 100 and the auxiliary braking force adjusting device 200 may be connected to CAN and two separate wiring lines. The main braking force adjusting device 100 may transmit a constant signal to the auxiliary braking force adjusting device 200 through CAN, and the auxiliary braking force adjusting device 200 may identify whether the main braking force adjusting device 100 fails through changes in the received signal. Also, the main braking force adjusting device 100 may apply a constant voltage to the auxiliary braking force adjusting device 200 through wiring, the auxiliary braking force adjusting device 200 may determine that a failure has occurred in the main braking force adjusting device 100 when the received voltage is lowered to below a predetermined level. Here, the communication line through which the failure of the main braking force adjusting device 100 and the auxiliary braking force adjusting device 200 may be checked may be referred to as a first failure confirmation line 111, and an additional wiring connection line may be referred to as a second failure confirmation line 110. Through the double-connected failure confirmation lines 110 and 111, whether the main braking force adjusting device 100 has a failure may be more reliably identified even when one of the failure confirmation lines does not operate normally.

Also, the brake traction control system (BTCS) may be a system helping a vehicle start stably by adjusting braking force acting on the driving wheels, and may be a driving wheel in which a wheel including second hydraulic brakes 503 and 504, not connected to the auxiliary braking force regulator 200 through a hydraulic line, that is, a wheel including the first electronic brake 601 and the second electronic brake 602 which may be electrically connected, may be connected to an engine or motor and generates driving force of the vehicle.

When it is identified that a failure has occurred in the main braking force adjusting device 100, the auxiliary braking force adjusting device 200 may allow driving in the redundant braking control mode to control the braking of the vehicle. The auxiliary braking force adjusting device 200 may control the braking force of the front and rear wheels using the electronic brakes 601 and 602 provided on the wheels provided with the first hydraulic brakes 501 and 502 and the second hydraulic brakes 503 and 504. Meanwhile, the electronic brakes 601 and 602 may generate braking force by driving an electric motor in response to an electrical signal, and accordingly, differently from the hydraulic brakes 501, 502, 503, and 504, due to the time during which the electric motor is driven by receiving the braking signal, a braking delay may occur between the braking start signal and braking force generation. The auxiliary braking force adjusting device 200 may allow driving the electric motor in a state in which the electric motor is operated in advance for a predetermined time period (e.g., 500 ms) to improve a response delay of the electronic brakes 601 and 602. The time for operating the electric motor may be determined in consideration of drag so that responsiveness of the electronic brakes 601 and 602 may improve, and ride comfort and fuel efficiency may not be reduced, depending on the type of vehicle and the type of tire wheel.

Meanwhile, the auxiliary braking force adjusting device 200 may differently determine and apply the pre-operation time of the electronic brake 601 and 602 according to a risk level. That is, the auxiliary braking force adjusting device 200 may determine the risk level based on a distance to an obstacle and a speed of the vehicle, and may apply the pre-operation time of the electronic brakes 601 and 602 differently according to the determined risk level. For example, the pre-operation time of the electronic brakes 601 and 602 may be 400 ms in the danger level 1, 600 ms in the danger level 2, and 1200 ms in the danger level 3. In the risk level 3, the pre-operation time may be applied without considering occurrence of drag caused by the pre-operation of the electronic brakes 601 and 602 so that immediate braking force may be generated rather than in terms of ride comfort or fuel efficiency of the vehicle.

Accordingly, even when a failure occurs in the main braking force adjusting device 100, the electronic brake 601 and 602 may be used to control the braking force of the front and rear wheels of the vehicle, stably maintaining the driving state.

Figure 2:
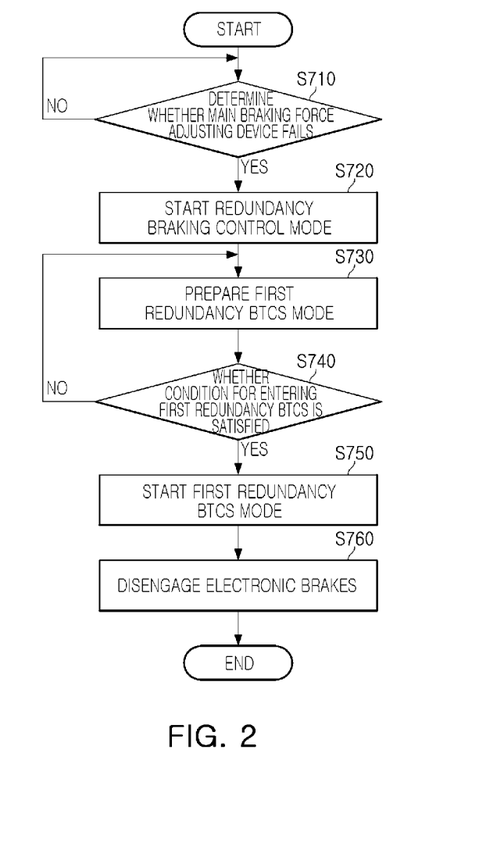
FIG. 2 is a flowchart illustrating a brake traction control system (BTCS) using a redundancy braking system according to an exemplary embodiment of the present disclosure.
Figure 3:
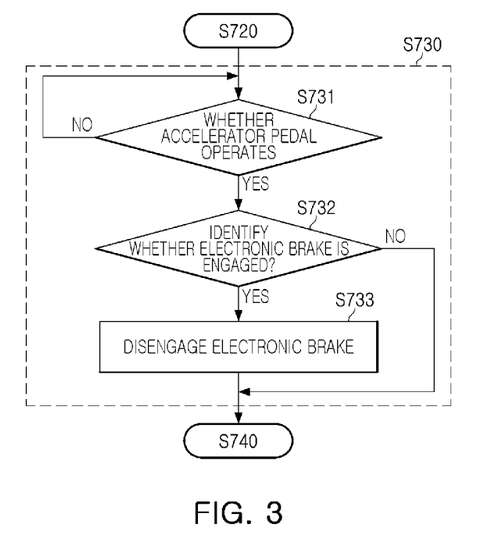
FIG. 3 is a flowchart illustrating operation S730 according to an exemplary embodiment of the present disclosure.
Figure 4:
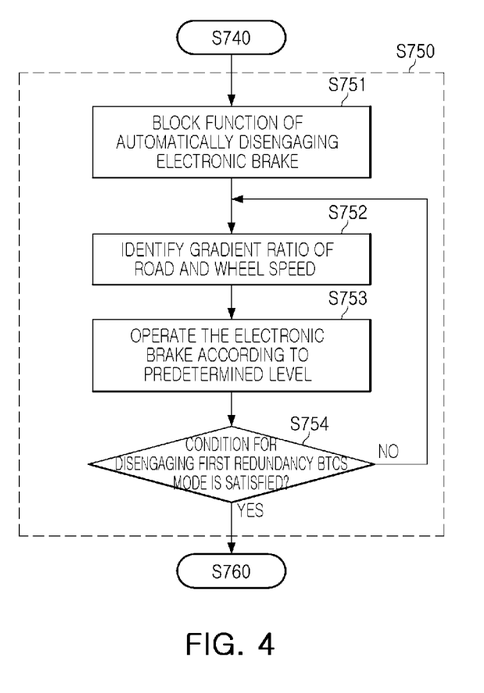
FIG. 4 is a flowchart illustrating operation S750 according to an exemplary embodiment of the present disclosure.

FIG. 2 is a flowchart illustrating a brake traction control system (BTCS) using a redundancy braking system according to an exemplary embodiment of the present disclosure. FIG. 3 is a flowchart illustrating operation S730 according to an exemplary embodiment of the present disclosure. FIG. 4 is a flowchart illustrating operation S750 according to an exemplary embodiment of the present disclosure.

The auxiliary braking force adjusting device 200 may check whether the main braking force adjusting device 100 has a failure through the first failure confirmation line 111 and the second failure confirmation line 110 (S710). Here, the auxiliary braking force adjusting device 200 may determine that the main braking force adjustment device 100 fails even when the failure of the main braking force control device 100 is confirmed only through one of the first failure confirmation line 111 and the second failure confirmation line 110.

When it is identified that a failure has occurred in the main braking force adjusting device 100, the auxiliary braking force adjusting device 200 may drive in a redundant braking control mode of controlling the braking of the vehicle (S720). The auxiliary braking force adjusting device 200 may control the braking force of the front and rear wheels the electronic brakes 601 and 602 provided on the wheels provided with the first hydraulic brakes 501 and 502 and the second hydraulic brakes 503 and 504. The auxiliary braking force adjusting device 200 may control braking force of the front and rear wheels of the vehicle using the electronic brakes 601 and 602 electrically connected to the first hydraulic brakes 501 and 502 connected to the auxiliary braking force adjusting device 200 by a hydraulic line, even when a failure occurs in the main braking force adjusting device 100.

The auxiliary braking force adjusting device 200 may perform an operation of preparing a first redundancy brake traction control system (BTCS) mode among the redundant braking control modes (S730). The operation S730 of preparing the first redundancy brake traction control system (BTCS) mode will be described in greater detail with reference to FIG. 3. In the operation S730 of preparing the first redundancy brake traction control system (BTCS) mode (S730), it may first be determined whether the accelerator pedal 400 of the vehicle is operated (S731). When the accelerator pedal 400 of the vehicle operates, preparation for the first redundancy brake traction control system (RDD BTCS) mode may start. Furthermore, when the accelerator pedal 400 of the vehicle operates, it may be checked whether the electronic brake (e.g., an electronic parking brake (EPB)) of the vehicle is engaged (S732). It is checked whether an electronic brake (e.g., an electronic parking brake (EPB)) is engaged, and when it is engaged, the engagement may be released (S733).

Meanwhile, the reason for releasing the electronic brakes 601 and 602 may be that the electronic brake does not have a stroke sensor so that the exact position of the braking pad generating braking force in the electronic brake may not be recognized. By adjusting the operation time of the electric motor in a state in which the electronic brakes 601 and 602 are completely released, the position of the EPB pad may be controlled to a desired position. That is, when the electronic brake includes a stroke sensor and the position of the braking pad may be accurately determined, after the electronic brake is disengaged, by determining a position value of the braking pad, instead of applying the operation time of the electric motor, without disengaging the electronic brake, the brake pads may be placed in a predetermined position. An exemplary embodiment of the present disclosure is described with reference to an electronic brake not provided with a stroke sensor, but an exemplary embodiment thereof is not limited thereto, and various methods for moving the braking pad to a predetermined position may be applied.

Thereafter, it may be determined whether the condition for entering the first redundancy brake traction control system mode is satisfied (S740). When the entry condition is satisfied, the first redundancy brake traction control system mode may be started (S750). When the entry condition is not satisfied, the vehicle may be driven in the redundant braking control mode in which the auxiliary braking force adjusting device 200 controls the braking of the vehicle (S720).

The first redundancy brake traction control system mode may be a system for preventing wheel spin during start and acceleration of the vehicle and improving grip with the road surface. Accordingly, the first redundant brake traction control system mode may be applied when slips of different sizes occur in driving wheels on the left and right sides when the vehicle stops and starts while driving in the redundancy braking control system mode in which the first auxiliary braking force adjusting device 200 controls the braking of the vehicle. The entering the first redundancy brake traction control system mode may be determined based on a difference in wheel speed detected by the first wheel speed sensor 311 and the second wheel speed sensor 312. The auxiliary braking force adjusting device 200 may determine the estimated speed of the vehicle using a companion diameter of a tire based on the detected wheel speed. In the instant case, when a substantial amount of wheel slip occurs, the estimated speed may have a higher value as compared to the actual driving speed of the vehicle, and the amount of wheel slip generated in each wheel may be compared by comparing the estimated speed determined based on the wheel speed detected in each wheel. The entering the first redundancy brake traction control system mode may be performed when the difference between the estimated speeds of the vehicle estimated based on the first wheel speed sensor 311 and the second wheel speed sensor 312 is equal to or greater than a predetermined speed (for example, 15 kph (kilometers per hour) or more).

Also, the first redundancy brake traction control system mode may be initiated based on the gradient ratio of the road on which the vehicle is travelling (e.g., when the gradient ratio is 8% or more). This is because, when starting on an inclined road after stopping, greater driving force may be required than on flat ground, which may cause excessive wheel slip in the vehicle. Here, the gradient ratio (%) of the road on which the vehicle is traveling may be determined by applying the example in which the slope of the road on which the vehicle is traveling is 45 degrees as 100%.

Also, the first redundancy brake traction control system mode may be applied when the vehicle starts after stopping, and a condition for the speed at which the driving speed of the vehicle may be determined to be in the starting state from stopping may be further applied. For example, a condition for entering the first redundancy brake traction control system mode may be added when the actual vehicle traveling speed is 15 kph or less.

When the condition for entering the first redundancy brake traction control system mode is satisfied, the first redundancy brake traction control system mode may be started (S750). The first redundancy brake traction control system mode will be described in greater detail with reference to FIG. 4. When the first redundancy brake traction control system mode is activated, an automatic release function of the electronic brakes 601 and 602 may be blocked (S751). The automatic release function of the electronic brakes 601 and 602 may be a function of automatically releasing the electronic brakes 601 and 602 when a user applies a stroke to the accelerator pedal 400. For example, in a vehicle including an EPBP, when a user applies a stroke to the accelerator pedal 400, the vehicle may automatically release the EPB for acceleration. Meanwhile, the first redundancy brake traction control system may control the vehicle by manipulating the electronic brakes 601 and 602, and may actively use the electronic brake. Accordingly, when the first redundancy brake traction control system mode is activated, the function of automatically releasing the electronic brakes may conflict with the mode and may need to be blocked.

Thereafter, the gradient ratio and the wheel speed of the road on which the vehicle is traveling may be detected (S752). The gradient ratio of the road on which the vehicle is traveling may be detected through the slope sensor 320 provided in the vehicle. Also, the speeds of the left and right wheel may be detected through the first wheel speed sensor 311 and the second wheel speed sensor 312 provided in the vehicle.

The auxiliary braking force adjusting device 200 may operate the electronic brakes 601 and 602 based on the wheel speed and the gradient of the road on which the vehicle is travelling (S753). In the instant case, the auxiliary braking force adjusting device 200 may individually control the first electronic brake 601 and the second electronic brake 602. The auxiliary braking force adjusting device 200 may determine that more wheel slip occurs in the wheel in which the greater wheel speed is detected among the first wheel speed sensor 311 and the second wheel speed sensor 312, and may control the braking force of the wheel from which more wheel speed is detected through the first electronic brake 601 or the second electronic brake 602. Here, the magnitude of braking force generated through the first electronic brake 601 or the second electronic brake 602 may be applied differently according to the gradient ratio of the road on which the vehicle is traveling. This is because, as the gradient ratio of the road on which the vehicle is traveling increases, a greater driving force may be generated due to an effect of gravity so that braking force for braking the driving force may need to be increased as well. The auxiliary braking force adjusting device 200 may have three levels as in Table 1 according to the gradient ratio of the road on which the vehicle is traveling, and the driving time of the first electronic brake 601 or the second electronic brake 200 may be determined according to each level as in Table 2 to control braking force. However, an exemplary embodiment of the present disclosure is not limited to the three levels, and the application level may be further subdivided.

TABLE 1

| Gradient ratio (%) | First electronic brake (601) | First electronic brake (601) |
|---|---|---|
| 8 or more and less than 12 | level 1 | level 1 |
| 12 or more and less than 15 | level 2 | level 2 |
| 15 or more | level 3 | level 3 |

TABLE 2

| Level | First electronic brake (601) (ms, millisecond) | First electronic brake (601) (ms, millisecond) |
|---|---|---|
| level 1 | 50 ms | 50 ms |
| level 2 | 100 ms | 100 ms |
| level 3 | 150 ms | 150 ms |

In other words, the auxiliary braking force adjusting device 200 may control the first electronic brake 601 or the second electronic brake 602 provided in a wheel including a greater wheel speed than the wheel speed detected by the first wheel speed sensor 311 and the second wheel speed sensor 312. For example, when the wheel speed value of the first wheel speed sensor 311 is greater than the wheel speed value of the second wheel speed sensor 312, more wheel slip may occur in the first wheel speed sensor 311. Braking force may be generated on a wheel including the first wheel speed sensor 311 in which a large amount of wheel slip occurs, and the engine may start using driving force of a wheel including the second wheel speed sensor 312 in which a relatively small wheel slip occurs. The first electronic brake 601 of the wheel including the first wheel speed sensor 311 may be controlled by applying a level according to the gradient of the vehicle, and the second electronic brake 602 of the wheel provided with the second wheel speed sensor 312 may not be controlled.

Meanwhile, the driving time of the electric motor of the first electronic brake 601 and the second electronic brake 602 determined as in Table 2 may be determined in consideration of occurrence of drag to reduce the wheel speed of the target vehicle, but to not reduce ride comfort and fuel economy.

The auxiliary braking force adjusting device 200 may determine whether a condition for releasing the first redundancy brake traction control system mode is satisfied (S754). When the condition for releasing the first redundancy brake traction control system mode is not satisfied, the operation S752 may be performed again. Furthermore, when the condition for releasing the first redundancy brake traction control system mode is satisfied, the electronic brakes 601 and 602 may be released and the first redundancy brake traction control system mode may be terminated (S760).

Here, the condition for releasing the first redundancy brake traction control system mode may be the condition in which the condition in which the difference between the estimated speeds based on the wheel speed detected by the first wheel speed sensor 311 and the second wheel speed sensor 312 is equal to or less than a predetermined value (e.g., 0.5 kph).

Figure 5:
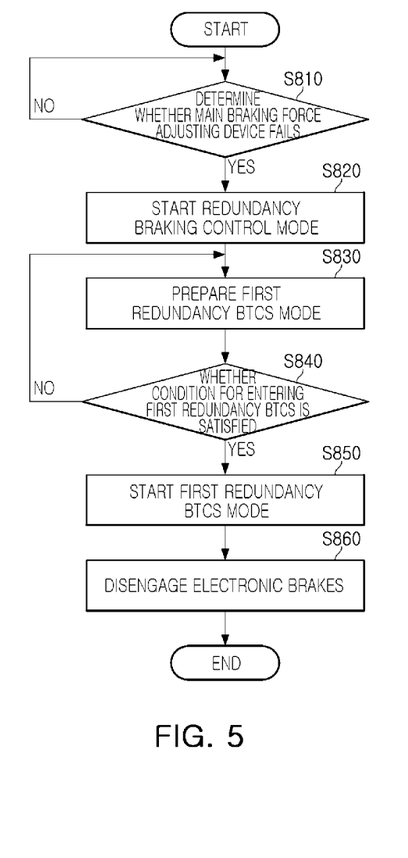
FIG. 5 is a flowchart illustrating a brake traction control system (BTCS) using a redundancy braking system according to another exemplary embodiment of the present disclosure.
Figure 6:
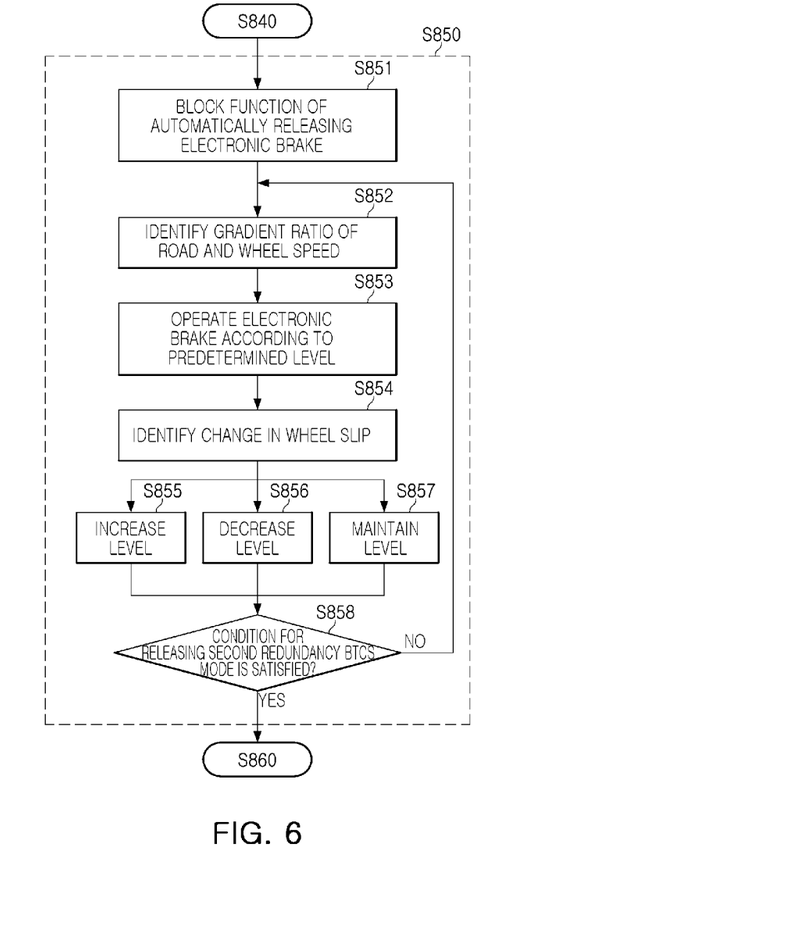
FIG. 6 is a flowchart illustrating operation S850 according to another exemplary embodiment of the present disclosure.

FIG. 5 is a flowchart illustrating a brake traction control system (BTCS) using a redundancy braking system according to another exemplary embodiment of the present disclosure. FIG. 6 is a flowchart illustrating operation S850 according to another exemplary embodiment of the present disclosure.

The brake traction control system (BTCS) using the redundancy braking system may detect a change in the amount of wheel slip while driving in the redundancy brake traction control system mode, and may change the application level of the electronic brakes 601 and 602. Here, the redundancy brake traction control system mode of detecting a change in the amount of wheel slip while driving and changing the application level of the electronic brakes 601 and 602 may be referred to as a second redundancy brake traction control system mode. In the exemplary embodiment of the present disclosure, a detailed description of the operations S810 to S840 overlapping the descriptions described with reference to FIG. 2, FIG. 3 and FIG. 4 will not be provided, and differences will be described in detail with reference to FIG. 6.

The second redundancy brake traction control system mode may block the function of automatically releasing the electronic brakes 601 and 602 for a same reason as the first redundancy brake traction control system mode (S851). Thereafter, the gradient ratio and the wheel speed of the road on which the vehicle is traveling may be detected (S852). Through the gradient sensor 320 provided in the vehicle, the gradient ratio of the road on which the vehicle is traveling may be detected, and the level may be applied in three stages as illustrated in Table 1 above according to the gradient ratio of the road on which the vehicle is travelling. Also, the electronic brakes 601 and 602 may be operated according to the level determined according to the gradient ratio of the vehicle (S853). As illustrated in Table 2 above, the braking control may be performed according to the level applied to the first electronic brake 601 or the second electronic brake 602 provided in the wheel in which more wheel slip occurs with the predetermined values according to the gradient ratio.

The second redundancy brake traction control system mode may check a change in the amount of wheel slip (S854). The auxiliary braking force adjusting device may continuously or periodically check the wheel speed through the first wheel speed sensor 311 and the second wheel speed sensor 312, and may check the change in the amount of wheel slip. Here, the change in the amount of wheel slip may be determined through a difference between the actual driving speed of the vehicle and the estimated speed estimated based on the wheel speed sensor 310 provided in the vehicle. It may be identified that the amount of wheel slip increases when the difference between the actual vehicle traveling speed and the estimated speed increases, and when the difference between the actual vehicle traveling speed and the estimated speed decreases, it may be identified that the amount of wheel slip decreases. However, an exemplary embodiment thereof is not limited thereto, and the amount of wheel slip may be determined based on the difference in wheel speed detected by the first wheel speed sensor 311 and the second wheel speed sensor 312, and various methods for determining the amount of wheel slip may be applied.

The auxiliary braking force adjusting device 200 may increase the level applied to the first electronic brake 601 or the second electronic brake 602 when the change in the amount of generated wheel slip increases (S855). Furthermore, when the change in the amount of generated wheel slip is reduced, the level applied to the first electronic brake 601 or the second electronic brake 602 may be decreased. (S856). Furthermore, when there is no change in the amount of wheel slip generated, the auxiliary braking force adjusting device may maintain the level applied to the first electronic brake 601 or the second electronic brake 602 (S857).

The auxiliary braking force adjusting device 200 may determine whether a release condition of the second redundancy brake traction control system mode is satisfied (S858). When the release condition of the first redundancy brake traction control system mode is not satisfied, operation S852 may be performed again. That is, the second redundancy brake traction control system mode may optimize the control of the first electronic brake 601 or the second electronic brake 602 according to a wheel slip state changing at the time of starting. Furthermore, when the condition for releasing the second redundancy brake traction control system mode is satisfied, the electronic brakes 601 and 602 may be released and the second redundancy brake traction control system mode may be terminated (S860). Here, the condition for releasing the first redundancy brake traction control system mode may be the condition in which the condition in which the difference between the estimated speed based on the wheel speed detected by the first wheel speed sensor 311 and the second wheel speed sensor 312 is equal to or less than a predetermined value (e.g., 0.5 kph).

The methods according to an exemplary embodiment of the present disclosure may be implemented in a form of program instructions executed by various computer means and written in a computer-readable medium. The computer-readable medium may include program instructions, data files, data structures, and the like, alone or in combination. The program instructions written on the computer readable medium may be specially designed and configured for the present disclosure, or may be known and available to those skilled in the art of computer software.

Examples of computer-readable media may include hardware devices specially configured to store and carry out program instructions, such as ROM, RAM, flash memory, and the like. Examples of program instructions may include machine language codes such as those generated by a compiler, and also high-level language codes executed by a computer using an interpreter. The hardware device described above may be configured to operate as at least one software module to perform the operations of the present disclosure, and vice versa.

According to the aforementioned embodiments, the brake traction control system (BTCS) using the redundancy braking system (BTCS) may, when a failure in occurs in the main braking force adjusting device, allow the brake traction control system to be used even while braking force of the driving wheels is controlled using the electronic brake using the auxiliary braking force adjusting device so that driving stability of the vehicle may be secured and user convenience may increase.

In an exemplary embodiment of the present invention, the main braking force adjusting device 100 and the auxiliary braking force adjusting device 200 may include a controller.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A brake traction control system (BTCS) using a redundancy braking system, the brake traction control system comprising:
    a main braking force adjusting device configured to control a hydraulic brake of a vehicle;
    a sensor unit configured to detect a driving state of the vehicle;
    an electronic brake electrically operating and configured to generate braking force for at least one driving wheel of the vehicle; and
    an auxiliary braking force adjusting device configured to control the hydraulic brake and the electronic brake when a failure occurs in the main braking force adjusting device,
    wherein the auxiliary braking force adjusting device is configured to adjust the braking force of the electronic brake provided on at the least one wheel on left and right sides of the vehicle based on a detected value of the sensor unit,
    wherein the auxiliary braking force adjusting device applies the longer pre-operation time of the electronic brake as a risk level increases, and
    wherein the risk level is determined based on a distance to an obstacle and a speed of the vehicle.

2. The brake traction control system of claim 1, wherein the sensor unit includes:
    a wheel speed sensor configured to detect a rotation speed of the at least one wheel of the vehicle; and
    a gradient sensor configured to detect a slope of a road on which the vehicle is travelling.

3. The brake traction control system of claim 2,
    wherein the at least one wheel of the vehicle includes a left wheel and a right wheel, and
    wherein the wheel speed sensor includes a first wheel speed sensor provided on one of the left wheel and the right wheel and a second wheel speed sensor provided on the other of the left wheel or the right wheel.

4. The brake traction control system of claim 1,
    wherein the at least one wheel of the vehicle includes a left wheel and a right wheel, and
    wherein the electronic brake includes a first electronic brake provided on one of the left wheel and the right wheel and a second electronic brake provided on the other of the left wheel and the right wheel.

5. The brake traction control system of claim 4, wherein the auxiliary braking force adjusting device is configured to selectively adjust braking force of the first electronic brake and the second electronic brake based on a wheel speed detected by the sensor unit.

6. The brake traction control system of claim 5, wherein the auxiliary braking force adjusting device is configured to control the electronic brake provided on a wheel including a greater wheel speed among the at least one wheel detected by the sensor unit.

7. The brake traction control system of claim 4, wherein the auxiliary braking force adjusting device is configured to adjust a magnitude of the braking force of the electronic brake based on a gradient ratio detected by the sensor unit.

8. The brake traction control system of claim 1, wherein the auxiliary braking force adjusting device is configured to control a magnitude of the braking force of the electronic brake by adjusting a driving time of the electronic brake.

9. The brake traction control system of claim 8, wherein the auxiliary braking force adjusting device is configured to apply a longer driving time of the electronic brake as a gradient ratio of a road on which the vehicle is traveling increases.

10. A brake traction control method using a redundancy braking system, the brake traction control method comprising:
    performing a redundancy braking control system mode in which a vehicle travels while controlling braking force of at least one driving wheel of the vehicle with an electronic brake;
    identifying whether a condition for entering the redundancy brake traction control system mode is satisfied; and
    travelling the vehicle in the redundant brake traction control system mode,
    wherein the travelling the vehicle in the redundant brake traction control system mode includes adjusting the braking force of the electronic brake provided on at least one of left and right sides of the at least one driving wheel based on a detected value of a sensor unit,
    wherein an auxiliary braking force adjusting device included in the redundancy braking system applies the longer pre-operation time of the electronic brake as a risk level increases, and
    wherein the risk level is determined based on a distance to an obstacle and a speed of the vehicle.

11. The brake traction control method of claim 10, further including:
    preparing a redundant brake traction control system (RDD BTCS) mode,
    wherein, when an accelerator pedal operates, the electronic brake is disengaged.

12. The brake traction control method of claim 10,
    wherein the at least one wheel of the vehicle includes a left wheel and a right wheel, and
    wherein the condition for entering the redundancy brake traction control system mode is a condition in which an estimated vehicle speed determined based on a wheel speed of the left wheel and the right wheel is determined, and a difference between the determined estimated vehicle speeds is equal to or greater than a predetermined value.

13. The brake traction control method of claim 10, wherein the condition for entering the redundancy brake traction control system mode is a condition in which a gradient ratio of a road on which the vehicle is traveling is equal to or greater than a predetermined value.

14. The brake traction control method of claim 10, wherein the travelling in the redundant brake traction control system mode includes:
   identifying a gradient ratio of a road on which the vehicle is traveling and a wheel speed; and
   performing braking control of the electronic brake based on the gradient ratio and the wheel speed.

15. The brake traction control method of claim 14, wherein the performing braking control of the electronic brake includes:
   controlling the electronic brake provided on a wheel including a greater wheel speed among the at least one wheel, and
   adjusting a magnitude of the braking force of the electronic brake based on the gradient ratio.

16. The brake traction control method of claim 14, wherein a magnitude of the braking force of the electronic brake is controlled by determining a level of a driving state of the vehicle based on a table provided according to the gradient ratio, and adjusting a driving time of the electronic brake according to the determined level.

17. The brake traction control method of claim 14, wherein the performing braking control of the electronic brake includes:
   identifying a change in wheel slip; and
   adjusting the braking force of the electronic brake according to the change in the wheel slip.

18. The brake traction control method of claim 17, wherein the adjusting braking force of the electronic brake according to the change in the wheel slip includes increasing the braking force of the electronic brake when the wheel slip increases, and decreasing the braking force of the electronic brake when the wheel slip decreases.

19. The brake traction control method of claim 10, further including:
   identifying whether a condition for releasing the redundancy brake traction control system mode is satisfied,
   wherein the redundancy brake traction control system mode is released when a speed difference between wheels on first and second sides of the vehicle is equal to or less than a predetermined value, and when the redundancy brake traction control system mode is released, the electronic brake is also disengaged.

20. The brake traction control method of claim 10, wherein the travelling in the redundant brake traction control system mode includes:
   blocking a function of automatically disengaging the electronic brake when an accelerator pedal of the vehicle is operated.

* * * * *